United States Patent
Cashler et al.

(10) Patent No.: US 7,349,783 B2
(45) Date of Patent: Mar. 25, 2008

(54) SUPPLEMENTAL RESTRAINT DEPLOYMENT METHOD WITH ANTICIPATORY CRASH CLASSIFICATION

(75) Inventors: Robert J. Cashler, Kokomo, IN (US); Junqiang Shen, Kokomo, IN (US); Walter Kirk Kosiak, Kokomo, IN (US); Russell L. Simpson, Noblesville, IN (US); Charles A. Cluff, Zionsville, IN (US)

(73) Assignee: Delphi Technologies, Inc., Troy, MI (US)

( * ) Notice: Subject to any disclaimer, the term of this patent is extended or adjusted under 35 U.S.C. 154(b) by 345 days.

(21) Appl. No.: 11/150,730

(22) Filed: Jun. 9, 2005

(65) Prior Publication Data

US 2006/0282202 A1    Dec. 14, 2006

(51) Int. Cl.
   *G06F 19/00* (2006.01)
   *B60R 21/16* (2006.01)
(52) U.S. Cl. .................................. 701/45; 280/735
(58) Field of Classification Search ................. None
   See application file for complete search history.

(56) References Cited

U.S. PATENT DOCUMENTS

| | | | |
|---|---|---|---|
| 5,835,007 A * | 11/1998 | Kosiak .................. 340/436 |
| 6,031,484 A | 2/2000 | Bullinger et al. |
| 6,199,903 B1 * | 3/2001 | Brambilla et al. .......... 280/735 |
| 6,236,308 B1 * | 5/2001 | Dalum ....................... 340/436 |
| 6,453,225 B1 * | 9/2002 | Roelleke ...................... 701/45 |
| 6,711,485 B2 * | 3/2004 | Feser et al. .................. 701/45 |
| 6,725,141 B2 * | 4/2004 | Roelleke ...................... 701/45 |
| 2003/0100983 A1 | 5/2003 | Bullinger et al. |
| 2006/0138758 A1 * | 6/2006 | Roelleke et al. ............ 280/735 |

FOREIGN PATENT DOCUMENTS

DE    102 46 800    4/2004

* cited by examiner

*Primary Examiner*—Michael J. Zanelli
(74) *Attorney, Agent, or Firm*—Douglas D. Fekete

(57) ABSTRACT

A supplemental restraint deployment method utilizes measured vehicle speed and acceleration and the output of a closing velocity sensor that detects the presence and closing rate of an approaching object prior to contact with the vehicle. The closing velocity and vehicle speed are utilized for classification of an impending crash event, where the deployment options vary depending on the crash classification. In the ensuing crash event, a classification-dependent algorithm is executed to determine if, when and what level of restraint deployment is warranted based on measures of actual crash severity. Additionally, the algorithm is reset when the calculated change in vehicle velocity reaches the initial closing velocity.

8 Claims, 7 Drawing Sheets

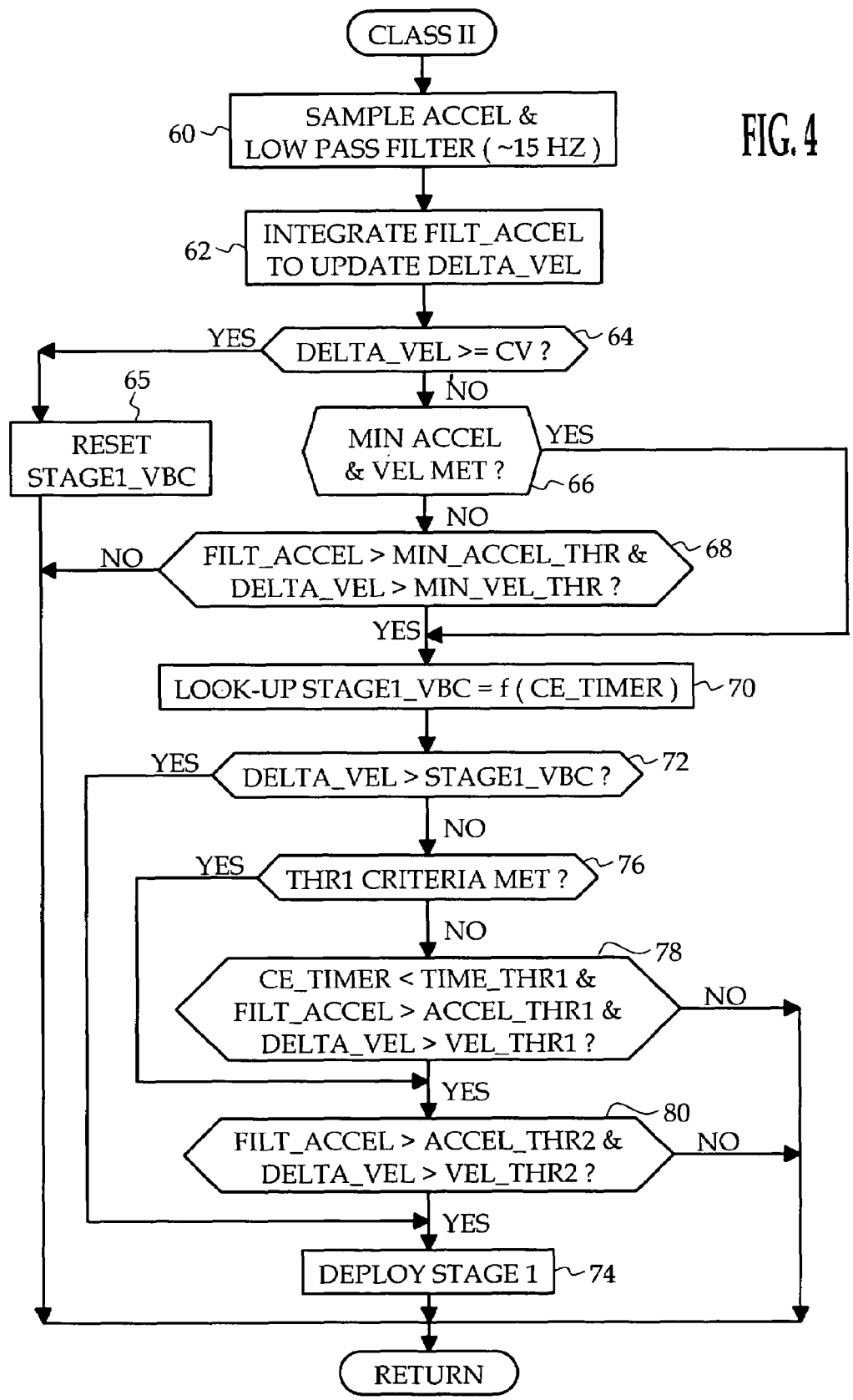

SUPPLEMENTAL RESTRAINT DEPLOYMENT METHOD WITH ANTICIPATORY CRASH CLASSIFICATION

TECHNICAL FIELD

The present invention relates to controlling the deployment of supplemental restraints such as airbags, and more particularly to a deployment method based on measured acceleration and closing velocity.

BACKGROUND OF THE INVENTION

Deployment algorithms for supplemental restraints such as airbags have traditionally relied almost exclusively on measured vehicle parameters such as acceleration and speed. In a typical approach, the onset of a crash event is detected when the longitudinal acceleration of the vehicle exceeds an initial threshold; in the course of the ensuing crash event, the vehicle's change in velocity is calculated by integrating the longitudinal acceleration and the airbags are deployed for occupant protection if and when the calculated change in velocity exceeds a time-varying velocity boundary curve (VBC).

The timeliness of crash discrimination and deployment can be improved through the addition of one or more remote acceleration sensors near the front of the vehicle, but this considerably increases system cost. Alternatively, it has been proposed to employ an anticipatory sensor such as a closing velocity (CV) sensor to detect the presence of an approaching object prior to collision. However, manufacturers have been reluctant to take any action based on the output of an anticipatory sensor because it is difficult or impossible to discriminate between objects that might result in a serious collision and objects that pose little or no danger to the vehicle occupants. Nevertheless, it has been suggested to use measurements such as closing velocity to determine the seriousness of an impending impact and to arm or activate a deployment algorithm. See, for example, Continental Automotive Systems' 2001 press release entitled "TEMIC: The intelligent car for maximum safety", which is available in the press release archive of Continental Automotive Systems' website (www.conti-online.com).

SUMMARY OF THE INVENTION

The present invention is directed to an improved supplemental restraint deployment method that utilizes measured vehicle speed and acceleration and the output of a closing velocity sensor that detects the presence and closing rate of an approaching object prior to contact with the vehicle. The closing velocity and vehicle speed are utilized for classification of a detected crash event, where the deployment options vary depending on the crash classification. In the course of the detected crash event, a classification-specific deployment algorithm is executed to determine if, when and what level of restraint deployment is warranted based on measures of actual crash severity. Additionally, the deployment algorithm is reset when the calculated change in vehicle velocity reaches the initial closing velocity.

BRIEF DESCRIPTION OF THE DRAWINGS

FIG. 4 depicts a flow diagram representative of a software routine executed by the ACM of FIG. 1 in the course of a CLASS II crash event;

DESCRIPTION OF THE PREFERRED EMBODIMENT

Figure 1:
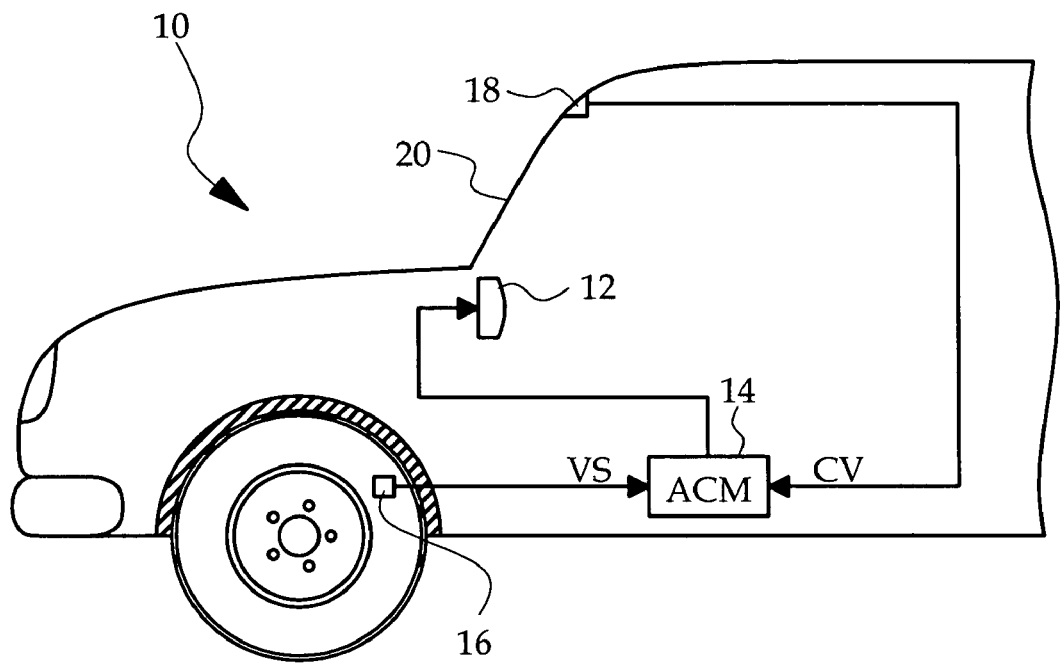
FIG. 1 is a diagram of a restraint system including a microprocessor-based airbag control module (ACM) programmed to carry out the method of the present invention.

Referring to FIG. 1, the reference numeral 10 generally designates a vehicle including one or more multi-stage supplemental restraints 12 such as airbags and a microprocessor-based airbag control module (ACM) 14. The ACM 14 has an internal accelerometer responsive to longitudinal acceleration of the vehicle 10, and also receives input signals pertaining to vehicle speed (VS) and closing velocity (CV) of an approaching object. The vehicle speed input VS is obtained from one or more conventional wheel speed sensors 16, and the closing velocity input CV is obtained from a closing velocity sensor 18 mounted on the interior surface of the vehicle windshield 20. An example of a suitable closing velocity sensor 18 is the CV sensor manufactured by Continental Automotive Systems (TEMIC), for example. This CV sensor emits a coded laser beam in the forward path of the vehicle 10 and decodes beam components reflected from an approaching object to identify its existence and determine the closing velocity. The ACM 14 uses the acceleration, vehicle speed and closing velocity inputs (ACCEL, VS, CV) to discriminate the severity of a crash event and to deploy one or more restraint 12 if the crash event is sufficiently severe. In the illustrated embodiment, the restraint 12 has two stages of deployment; the first stage is deployed when a detected crash event is at least moderately severe, and the second stage is deployed in addition to the first stage if the crash event is very severe.

Figure 2:
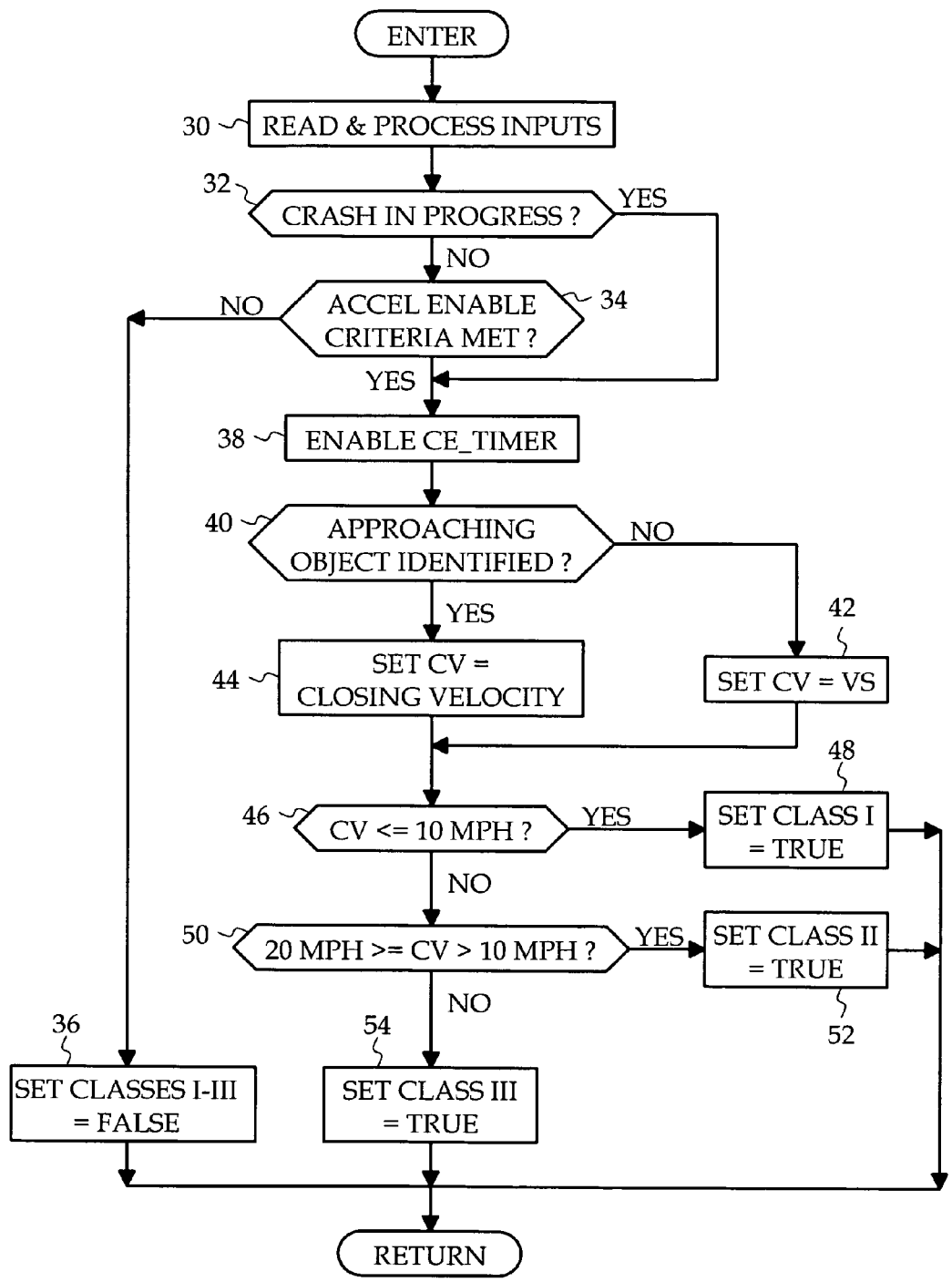
FIG. 2 is a flow diagram representative of a software routine executed by the ACM of FIG. 1 for classifying crash events according to this invention.

According to the present invention, ACM 14 utilizes the VS and CV inputs to classify a crash event once the ACCEL input exceeds an enable threshold. Referring to FIG. 2, this process is illustrated by the flow diagram blocks 30-54, which represent a software routine periodically executed by ACM 14. The inputs ACCEL, VS and CV are read and processed at block 30; the processing may involve low pass noise filtering, for example. The blocks 32-36 monitor the ACCEL input to detect the onset of a crash event, as indicated by an ACCEL value in excess of an enable threshold. Prior to the onset of a crash, blocks 32 and 34 are answered in the negative, and block 36 is executed to set flags for the various crash classifications (CLASS I, CLASS II and CLASS III) to FALSE. Once the ACCEL input exceeds the enable threshold, the block 34 is answered in the affirmative, and in subsequent executions of the routine, the block 32 is also answered in the affirmative to skip the block 34. As indicated, the blocks 38-54 are only executed after the onset of a crash event; and just a single pass through that portion of the routine is sufficient to classify the crash event. The block 38 enables the crash event timer (CE_TIMER), which provides a measure of the crash event duration. The blocks 40-44 then set the value of a closing velocity variable CV. The blocks 40-42 set CV equal to the vehicle speed VS if the CV sensor 18 has not identified an approaching object; this is equivalent to a collision between the vehicle 10 and a stationary object such as a barrier. However, if the CV sensor 18 has identified an approaching object, the block 44 sets the variable CV equal to the closing velocity provided by the sensor 18. The blocks 46-54 then classify the crash event based on the variable CV. The blocks 46-48 set the flag CLASS I to TRUE if CV is less than or equal to a low speed threshold such as 10 MPH. If CV is greater than the low speed threshold, but less than or equal to a medium speed threshold such as 20 MPH, the blocks 50-52 set the flag CLASS II to TRUE. If CV is greater than the medium speed threshold, the block 54 sets the flag CLASS III to TRUE.

According to this invention, the deployment options available to ACM 14 vary depending on the classification of the crash event. In a CLASS I crash event, airbag deployment is disabled entirely. In a CLASS II crash event, the ACM 14 is only permitted to deploy a first or low energy stage (STAGE 1) of the restraint 12, depending on the actual severity of the crash. In a CLASS III crash event, the ACM 14 is permitted to deploy STAGE 1 and also a high energy stage (STAGE 2) of restraint 12, again depending on the actual severity of the crash. The flow diagrams of FIGS. 3, 4 and 5A-5B respectively represent deployment routines executed by ACM 14 for CLASS I, CLASS II and CLASS III crash events.

Figure 3:
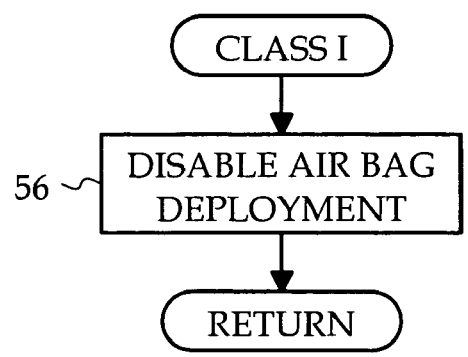
FIG. 3 depicts a flow diagram representative of a software routine executed by the ACM of FIG. 1 in the course of a CLASS I crash event.

Referring to the flow diagram of FIG. 3, the block 56 simply denotes that airbag deployment is disabled for a CLASS I crash event. As indicated above, the closing velocity (or vehicle speed) of a CLASS I crash event is less than or equal to a low speed threshold such as 10 MPH, and airbag deployment should be inhibited in such a collision even if the vehicle 10 collides with an object such as a stationary barrier.

The deployment routine represented by the flow diagram of FIG. 4 is periodically executed by ACM 14 during a CLASS II crash event. The block 60 samples and low pass filters the ACCEL input to form a filtered acceleration term FILT_ACCEL. As indicated, the low pass filter may have a cut-off frequency of about 15 HZ so as to pass only very low frequency components of the ACCEL input. The block 62 integrates FILT_ACCEL to produce a delta-velocity term (DELTA_VEL) corresponding to the change in vehicle velocity occasioned by the measured acceleration. In general, DELTA_VEL provides a reliable measure of crash energy, and restraint deployment usually occurs due to DELTA_VEL crossing a velocity boundary curve (VBC). Block 64 compares DELTA_VEL to the closing velocity CV determined in the flow diagram of FIG. 2; if DELTA_VEL is at least as great as CV, the crash event is deemed to be over, and block 65 resets the velocity boundary curve STAGE1_VBC, completing the routine. Initially of course, block 64 will be answered in the negative, and the blocks 66-68 determine if FILT_ACCEL and DELTA_VEL have exceeded respective minimum thresholds identified in FIG. 4 as MIN_ACCEL_THR and MIN_VEL_THR. Initially, block 66 is answered in the negative and block 68 compares FILT_ACCEL and DELTA_VEL to the respective minimum thresholds. Once the minimum thresholds are exceeded, the block 68 is answered in the affirmative, and in subsequent executions of the routine, the block 66 is also answered in the affirmative to skip the block 68. As indicated, the blocks 70-80 are only executed after the minimum thresholds MIN_ACCEL_THR and MIN_VEL_THR have been exceeded.

Once the minimum thresholds for FILT_ACCEL and DELTA_VEL have been exceeded, the blocks 70-72 determine if DELTA_VEL has exceeded a velocity boundary curve (VBC). The VBC is typically a implemented as a piecewise linear threshold having a value that increases in proportion to the crash event timer CE_TIMER. Also, there are different velocity boundary curves for the different stages of the restraint 12. Since the CLASS II deployment routine of FIG. 4 can only deploy STAGE 1 of the restraint 12, the block 70 determines the value of a STAGE 1 velocity boundary curve, designated as STAGE1_VBC. Representative velocity boundary curves are depicted in the crash event examples of FIGS. 6-7. If DELTA_VEL exceeds STAGE 1_VBC, the blocks 72-74 command STAGE 1 deployment of the restraint 12; otherwise, the ACM 14 proceeds to blocks 76-80.

The blocks 76-80 of FIG. 4 command STAGE 1 deployment of the restraint 12 if other prescribed crash energy criteria are met. The blocks 76-78 determine if FILT_ACCEL and DELTA_VEL have exceeded respective first thresholds identified in FIG. 4 as ACCEL_THR1 and VEL_THR1 before CE_TIMER reaches a threshold TIME_THR1 such as several milliseconds. Initially, block 76 is answered in the negative and block 78 compares CE_TIMER, FILT_ACCEL and DELTA_VEL to the respective first thresholds. If the criteria are met, the block 78 is answered in the affirmative, and in subsequent executions of the routine, the block 76 is also answered in the affirmative to skip the block 78. Alternatively, hysteresis may be applied to the thresholds to ensure positive detection of the crash energy criteria of block 78. As indicated, the block 80 is only executed if the criteria of block 78 have been met. The block 80 specifies additional crash energy criteria—namely that FILT_ACCEL and DELTA_VEL both exceed second thresholds identified in FIG. 4 as ACCEL_THR2 and VEL_THR2. If block 80 is answered in the affirmative, the block 74 is executed to command STAGE 1 deployment of the restraint 12 even though FILT_ACCEL failed to exceed STAGE1_VBC.

Figure 5A:
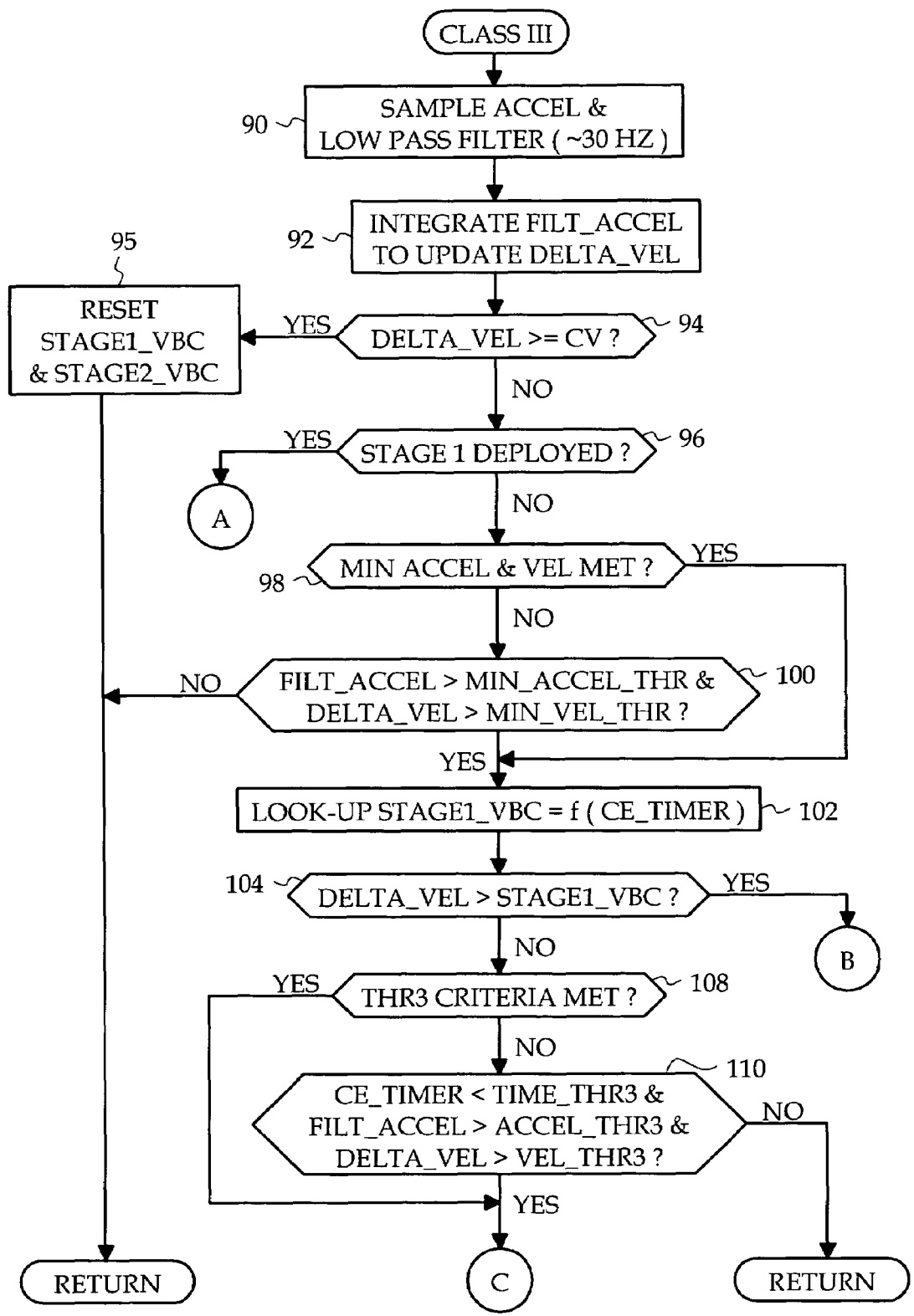
FIGS. 5A-5B together depict a flow diagram representative of a software routine executed by the ACM of FIG. 1 in the course of a CLASS III crash event.
Figure 5B:
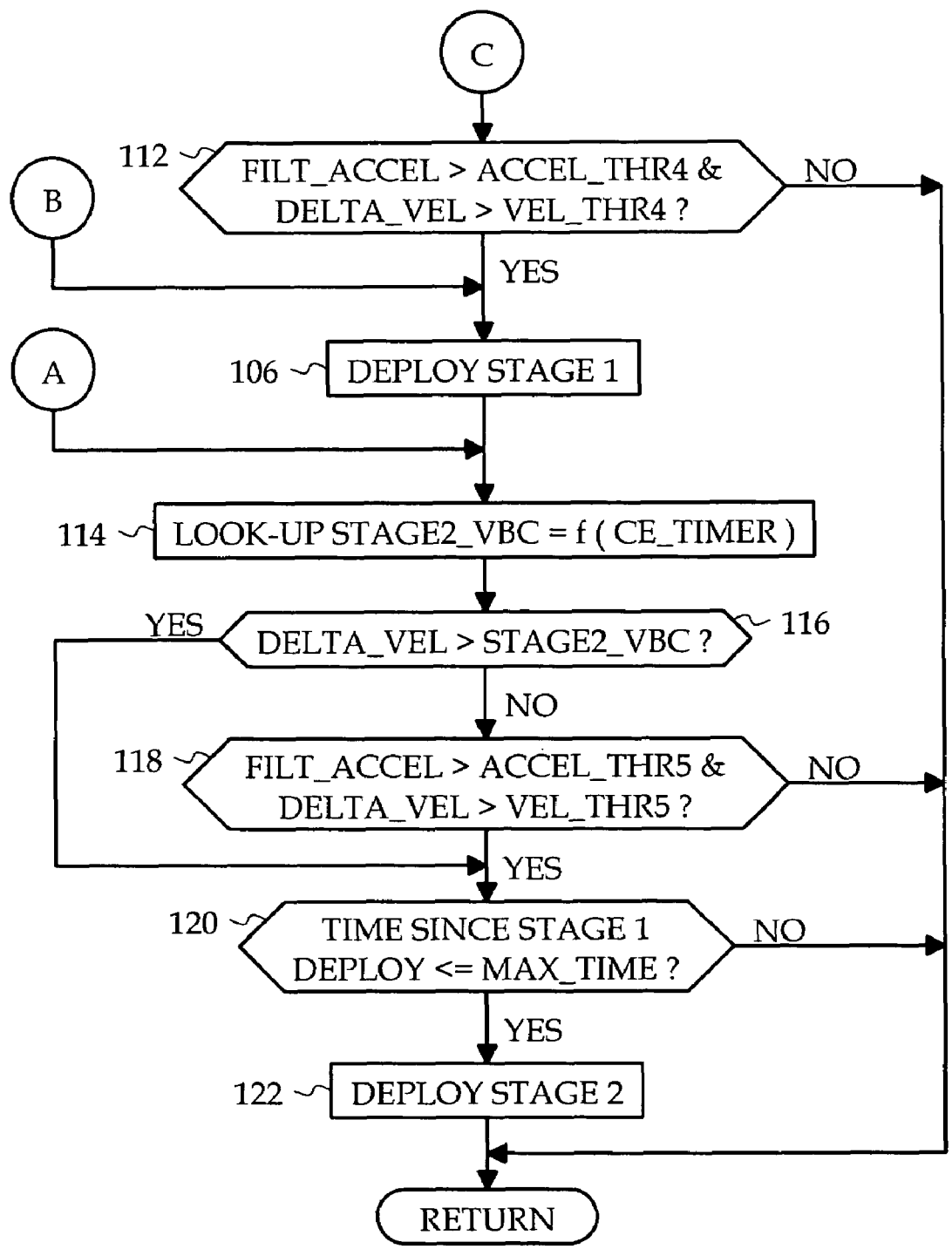

The deployment routine represented by the flow diagram of FIGS. 5A-5B is periodically executed by ACM 14 during a CLASS III crash event. The block 90 samples and low pass filters the ACCEL input to form a filtered acceleration term FILT_ACCEL. The low pass filter of block 90 may have a cut-off frequency of about 30 HZ to pass somewhat higher frequency components of the ACCEL input as compared to a CLASS II crash event because higher energy crash events tend to impart higher frequency oscillation to the vehicle 10. The block 92 integrates FILT_ACCEL to produce a delta-velocity term (DELTA_VEL) corresponding to the change in vehicle velocity occasioned by the measured acceleration, and the block 94 compares DELTA_VEL to the closing velocity CV determined in the flow diagram of FIG. 2. If DELTA_VEL is at least as great as CV, the crash event is deemed to be over, and block 95 resets the velocity boundary curves STAGE1_VBC and STAGE2_VBC, completing the routine. Initially, block 94 will be answered in the negative, and the block 96 is executed to determine if deployment of STAGE 1 of the restraint 12 has already been commanded. Block 96 will also initially be answered in the negative, and the blocks 98-112 are executed to determine if deployment of STAGE 1 should be commanded.

Similar to the CLASS II deployment routine, the blocks 98-100 of FIG. 5A determine if FILT_ACCEL and DELTA_VEL have exceeded the respective minimum thresholds MIN_ACCEL_THR and MIN_VEL_THR. Of course, the minimum thresholds for a CLASS III crash event may be different than the minimum thresholds for a CLASS II crash event. Initially, block 98 is answered in the negative and block 100 compares FILT_ACCEL and DELTA_VEL to the respective minimum thresholds. Once the minimum thresholds are exceeded, the block 100 is answered in the affirmative, and in subsequent executions of the routine, the block 98 is also answered in the affirmative to skip the block 100. As indicated, the remainder of the routine is only executed after the minimum thresholds MIN_ACCEL_THR and MIN_VEL_THR have been exceeded.

Once the minimum thresholds defined by block 100 of FIG. 5A have been exceeded, the blocks 102-104 determine if DELTA_VEL has exceeded the velocity boundary curve for STAGE 1 airbag deployment, STAGE1_VBC. Although the same variable names have been used in FIGS. 5A-5B as in FIG. 4, the velocity boundary curves for a CLASS III crash event are typically different than the velocity boundary curve for a CLASS II crash event. But as in the CLASS II deployment routine of FIG. 4, STAGE1_VBC is implemented as a piecewise linear threshold having a value that increases in proportion to the crash event timer CE_TIMER. See, for example, the velocity boundary curves depicted in the crash event examples of FIGS. 6-7. If DELTA_VEL exceeds STAGE1_VBC, the blocks 104-106 command STAGE 1 deployment of the restraint 12; otherwise, the ACM 14 proceeds to blocks 108-112.

The blocks 108-112 of FIG. 5A command STAGE 1 deployment of the restraint 12 if prescribed crash energy criteria are met. The blocks 108-110 determine if FILT_ACCEL and DELTA_VEL have exceeded respective third thresholds identified in FIG. 5A as ACCEL_THR3 and VEL_THR3 before CE_TIMER reaches a threshold TIME_THR3 such as several milliseconds. Initially, block 108 is answered in the negative and block 110 compares CE_TIMER, FILT_ACCEL and DELTA_VEL to the respective third thresholds. If the criteria are met, the block 110 is answered in the affirmative, and in subsequent executions of the routine, the block 108 is also answered in the affirmative to skip the block 110. Alternatively, hysteresis may be applied to the thresholds to ensure positive detection of the crash energy criteria of block 110, as mentioned above in respect to the deployment routine of FIG. 4. As indicated, the block 112 is only executed if the criteria of block 110 have been met. The block 112 specifies additional crash energy criteria—namely that FILT_ACCEL and DELTA_VEL both exceed respective fourth thresholds identified in FIG. 5A as ACCEL_THR4 and VEL_THR4. If block 112 is answered in the affirmative, the block 106 is executed to command STAGE 1 deployment of the restraint 12 even though FILT_ACCEL failed to exceed STAGE1_VBC.

Once deployment of STAGE 1 has been commanded, further execution of the blocks 98-112 is skipped as indicated by block 96, and the blocks 114-122 of FIG. 5B are executed instead. The minimum acceleration and velocity thresholds of block 100 will already have been met, and the blocks 114-116 determine if DELTA_VEL has exceeded a velocity boundary curve for STAGE 2 airbag deployment, STAGE2_VBC. As with STAGE1_VBC, STAGE2_VBC is implemented as a piecewise linear threshold having a value that increases in proportion to the crash event timer CE_TIMER, although STAGE2_VBC is typically initialized at an offset value. If DELTA_VEL exceeds STAGE2_VBC, the blocks 116 and 122 command STAGE 2 deployment of the restraint 12 so long as the time since STAGE 1 deployment is less than a calibrated time designated at block 120 as MAX_TIME. If DELTA_VEL fails to exceed STAGE2_VBC, ACM 14 proceeds to block 118. The block 118 determines if FILT_ACCEL and DELTA_VEL have exceeded respective fifth thresholds identified as ACCEL_THR5 and VEL_THR5. If the criteria of block 118 are met, the block 122 is executed to command STAGE 2 deployment, provided that the time since STAGE 1 deployment is less than MAX_TIME, even though FILT_ACCEL failed to exceed STAGE2_VBC.

Figure 6:
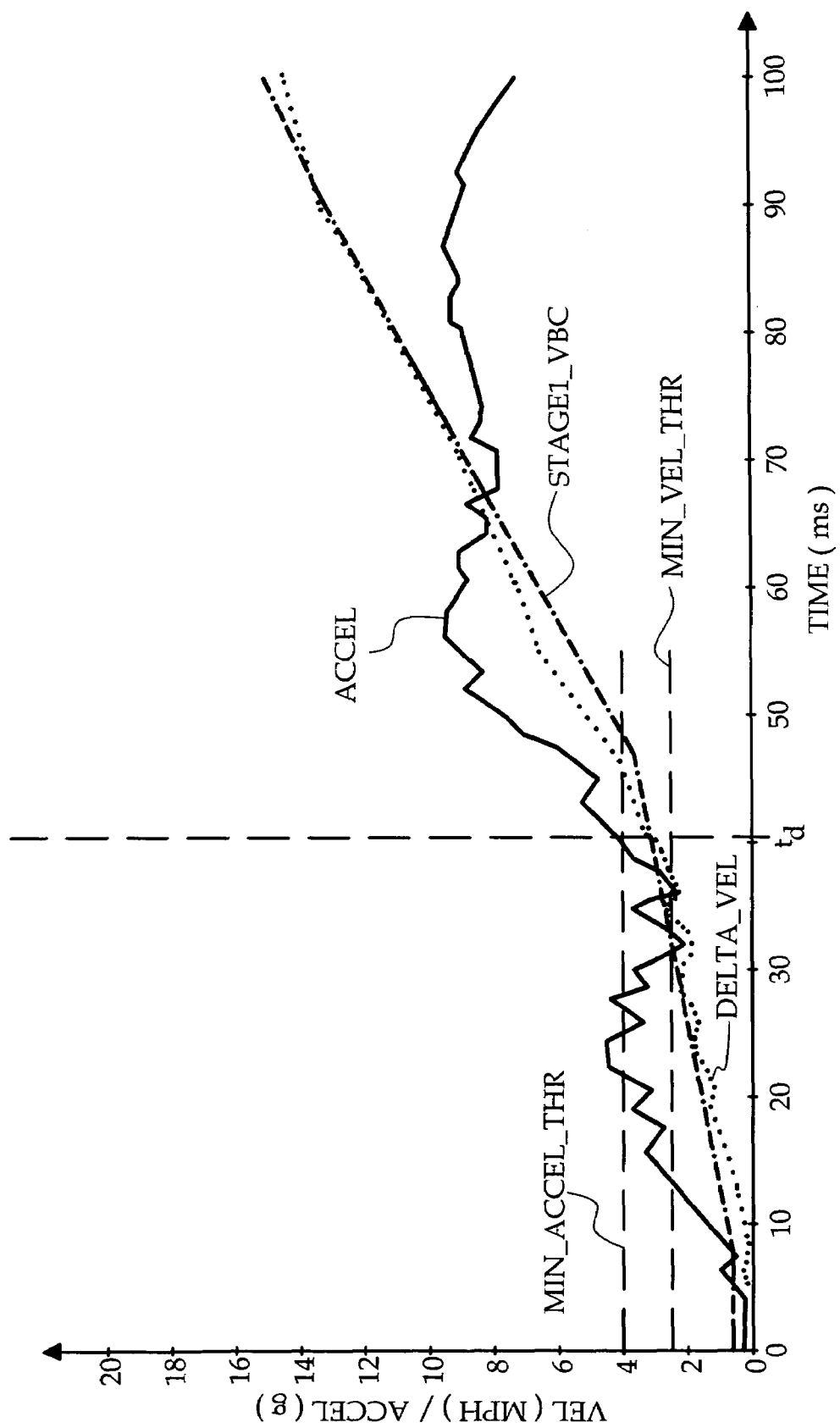
FIG. 6 is a graph illustrating the operation of the method of this invention during a CLASS II crash event.
Figure 7:
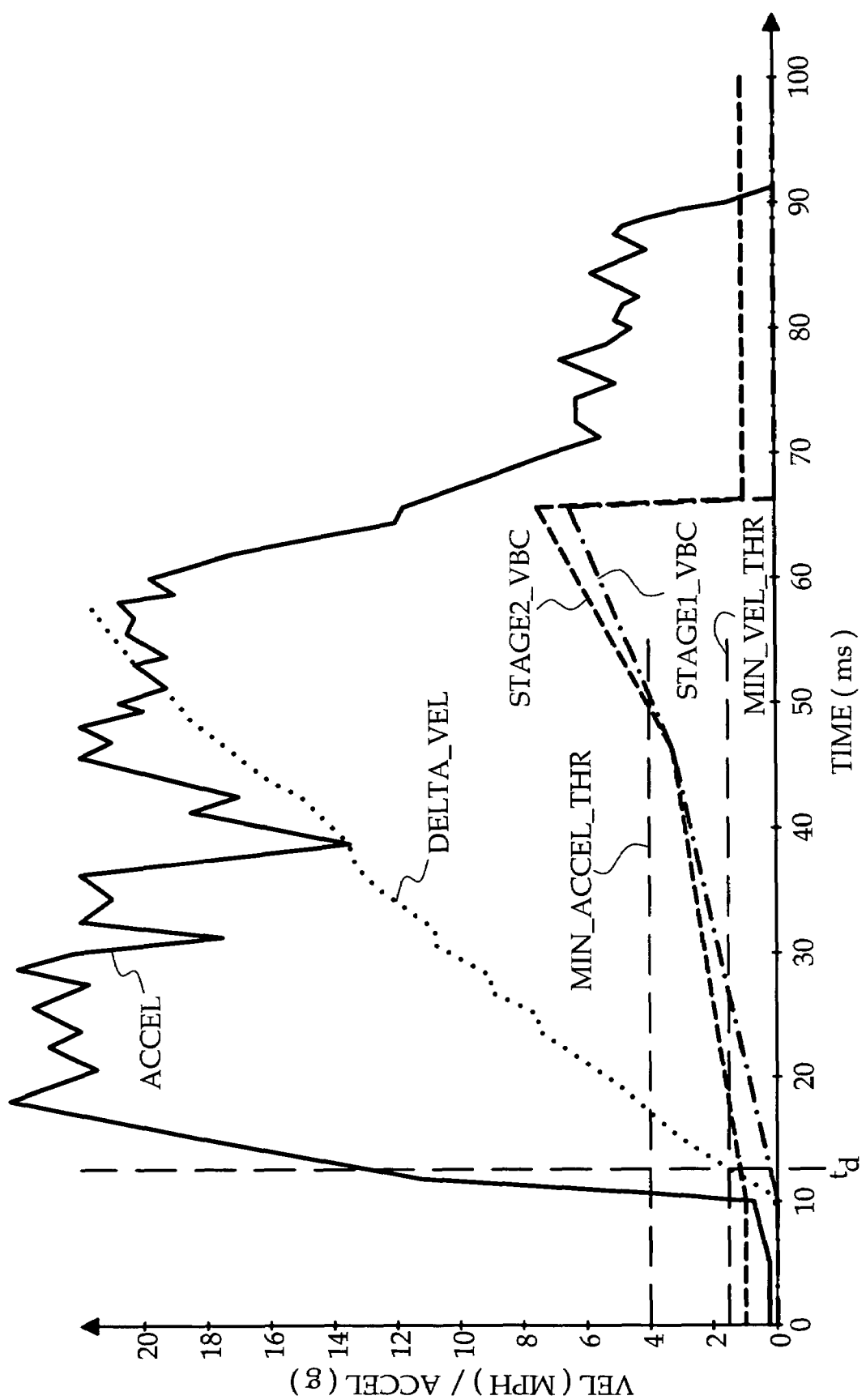
FIG. 7 is a graph illustrating the operation of the method of this invention during a CLASS III crash event.

FIGS. 6-7 depict the operation of the foregoing routines for two different crash events. FIG. 6 depicts a CLASS II crash event—that is, a crash event for which the closing velocity term CV at the onset of the crash was between 10 MPH and 20 MPH (the low and medium speed thresholds), as described above in reference to the flow diagram of FIG. 2. FIG. 7 depicts a CLASS III crash event—that is, a crash event for which the term CV at the onset of the crash exceeded 20 MPH (the medium speed threshold). In each case, the respective figure depicts FILT_ACCEL, DELTA_VEL, the minimum acceleration and velocity thresholds MIN_ACCEL_THR and MIN_VEL_THR, and the applicable velocity boundary curve.

Referring to FIG. 6, the onset of the depicted CLASS II crash event occurs at time t=4 ms. The terms FILT_ACCEL and DELTA_VEL exceed the respective minimum acceleration and velocity thresholds just prior to time t=40 ms, and DELTA_VEL exceeds the velocity boundary curve STAGE1_VBC shortly thereafter at time td, triggering a STAGE 1 deployment command. Since the depicted crash is a CLASS II event, there is no possibility of STAGE 2 deployment; consequently, STAGE1_is the only VBC depicted.

Referring to FIG. 7, the onset of the depicted CLASS III crash event occurs at time t=10 ms. Here, the crash energy is very high, and DELTA_VEL exceeds STAGE1_VBC before FILT_ACCEL and DELTA_VEL exceed the respective minimum thresholds MIN_ACCEL_THR and MIN_VEL_THR. In fact, DELTA_VEL even exceeds STAGE2_VBC before the minimum threshold criteria are met, despite the initial offset value of STAGE2_VBC. Thus, ACM 14 commands deployment of both STAGE 1 and STAGE 2 when the minimum threshold criteria are met—specifically, when DELTA_VEL exceeds MIN_VEL_THR at time td. At time t=67 ms, DELTA_VEL reaches the closing velocity CV, causing the reset of STAGE1_VBC and STAGE2_VBC, although this has no effect on restraint deployment in the illustrated example.

In summary, the present invention provides a deployment method in which a measure of closing velocity at the onset of a crash event is used to classify the crash event by apparent severity. The crash classification determines the permitted deployment outcomes, but actual measures of crash severity are used to command the permitted deployment level(s). Crash event classification based on closing velocity enables improved deployment timeliness because both the permitted deployment outcomes and the crash energy thresholds are classification dependent. Also, the cost impact of the CV sensor 18 is considerably less than that of multiple remote acceleration sensors in addition to ACM 14. While the present invention has been described with respect to the illustrated embodiment, it is recognized that numerous modifications and variations in addition to those mentioned herein will occur to those skilled in the art. For example, the number of crash classifications or the number or type of possible deployment outcomes for a given crash classification may be different than described herein, deployment may be based on various other factors such as occupant presence, and so on. Accordingly, it is intended that the invention not be limited to the disclosed embodiment, but that it have the full scope permitted by the language of the following claims.

The invention claimed is:

1. A deployment method for a supplemental restraint in a motor vehicle, comprising the steps of:

providing a sensor for identifying an object approaching said vehicle and determining a closing velocity between said vehicle and said identified object;

detecting an onset of a crash event based on a longitudinal acceleration of said vehicle, and storing a closing velocity determined by said sensor when said onset is detected;

determining a classification of said crash event based on the stored closing velocity;

executing one of a plurality of classification-specific deployment algorithms during said crash event to determine if and when deployment of said restraint is warranted based on measures of actual crash severity;

calculating a change in velocity of said vehicle due to said crash event; and disabling deployment of said restraint after the calculated change in velocity of said vehicle exceeds said stored closing velocity.

2. The deployment method of claim 1, including the steps of:

measuring a speed of said vehicle when said onset is detected; and determining the classification of said crash event based on the measured speed if no approaching object has been identified by said sensor.

3. The deployment method of claim 1, wherein one of said measures of actual crash severity is determined by low pass filtering and integrating said longitudinal acceleration, and a cut-off frequency of said low pass filtering depends on the determined classification.

4. The deployment method of claim 1, wherein said classification-specific deployment algorithms utilize classification-specific parameters for determining if and when deployment of said restraint is warranted.

5. The deployment method of claim 1, wherein said restraint is deployable in multiple stages, and the stages of the restraint that may be deployed during said crash event depend on the determined classification.

6. The deployment method of claim 1, including the steps of:

determining that said crash event is of a first classification if the stored closing velocity is less than a first threshold; and executing a deployment algorithm specific to said first classification for disabling deployment of said restraint.

7. The deployment method of claim 6, wherein said restraint is deployable in multiple stages, and said deployment method includes the steps of:

determining that said crash event is of a second classification if the stored closing velocity exceeds a first threshold but is less than a second threshold; and executing a deployment algorithm specific to said second classification for permitting deployment of less than all of the stages of said restraint.

8. The deployment method of claim 7, wherein said restraint is deployable in multiple stages, and said deployment method includes the steps of:

determining that said crash event is of a third classification if the stored closing velocity exceeds said second threshold; and executing a deployment algorithm specific to said third classification for permitting deployment of all of the stages of said restraint.

* * * * *